(12) United States Patent  
Bednar

(10) Patent No.: US 6,725,164 B1  
(45) Date of Patent: Apr. 20, 2004

(54) HYDROPHONE ASSEMBLY

(75) Inventor: Eugene D. Bednar, Houston, TX (US)

(73) Assignee: Input/Output, Inc., Stafford, TX (US)

( * ) Notice: Subject to any disclaimer, the term of this patent is extended or adjusted under 35 U.S.C. 154(b) by 0 days.

(21) Appl. No.: 09/913,753

(22) PCT Filed: Mar. 8, 2000

(86) PCT No.: PCT/US00/06024

§ 371 (c)(1),  
(2), (4) Date: Nov. 19, 2001

(87) PCT Pub. No.: WO00/55648

PCT Pub. Date: Sep. 21, 2000

Related U.S. Application Data

(60) Provisional application No. 60/125,076, filed on Mar. 17, 1999.

(51) Int. Cl.[7] ................................................. G01V 1/36
(52) U.S. Cl. ............................................. 702/17; 702/2
(58) Field of Search ............................ 702/2, 14, 17; 367/13, 22, 24, 182, 21, 15; 73/179

(56) References Cited

U.S. PATENT DOCUMENTS

| | | | | |
|---|---|---|---|---|
| 3,739,871 A | * | 6/1973 | Bailey | 175/1 |
| 4,049,077 A | * | 9/1977 | Mifsud | 181/114 |
| 4,057,780 A | * | 11/1977 | Shuck | 340/15.5 MC |
| 4,091,356 A | | 5/1978 | Hutchins | 340/3 T |
| 4,163,206 A | * | 7/1979 | Hall, Jr. | 340/17 R |
| 4,222,266 A | * | 9/1980 | Theodoulou | 73/179 |
| 4,223,556 A | * | 9/1980 | Hutchins | 73/179 |
| 4,253,164 A | * | 2/1981 | Hall, Jr. | 367/22 |
| 4,321,675 A | * | 3/1982 | Harris et al. | 702/14 |
| 4,353,121 A | * | 10/1982 | Ray et al. | 367/21 |
| 4,437,175 A | * | 3/1984 | Berni | 367/24 |
| 4,520,467 A | * | 5/1985 | Berni | 367/24 |
| 4,875,166 A | * | 10/1989 | Carroll et al. | 702/14 |
| 5,365,492 A | * | 11/1994 | Dragoset, Jr. | 367/21 |
| 5,408,440 A | * | 4/1995 | Badger | 367/13 |
| 5,408,441 A | * | 4/1995 | Barr et al. | 367/15 |
| 6,075,754 A | * | 6/2000 | Van Zandt et al. | 367/182 |
| 6,381,544 B1 | * | 4/2002 | Sallas et al. | 702/17 |
| 6,446,008 B1 | * | 9/2002 | Ozbek | 702/17 |
| 6,539,308 B2 | * | 3/2003 | Monk et al. | 702/17 |

FOREIGN PATENT DOCUMENTS

| | | |
|---|---|---|
| WO | WO 00/55648 | 9/2002 |

* cited by examiner

*Primary Examiner*—John Barlow  
*Assistant Examiner*—Victor J. Taylor  
(74) *Attorney, Agent, or Firm*—Madan, Mossman & Sriram, P.C.

(57) ABSTRACT

A hydrophone assembly is provided that has a frequency response that matches that of an accelerometer. In a preferred implementation, the frequency response resembles that of a differentiator in combination with a pair of simple lags.

17 Claims, 12 Drawing Sheets

HYDROPHONE ASSEMBLY

CROSS REFERENCE TO RELATED APPLICATIONS

This application claims priority from Patent Cooperation Treaty Application PCT/US00/06024 filed on Mar. 8, 2000, and further claims priority from U.S. Provisional Application Ser. No. 60/125,076 filed on Mar. 17, 1999, the entire specifications of which are hereby incorporated herein by reference.

BACKGROUND OF THE INVENTION

The present invention relates to hydrophones employed in seismic exploration. More particularly, the invention relates to an improved hydrophone circuit that provides the frequency response characteristics of an accelerometer.

Due to the increasing difficulty and cost of finding petroleum resources in the world today, exploration techniques are becoming more and more technologically sophisticated. For example, many have found crystal hydrophones to be useful in petroleum exploration. Basically, hydrophones are used to measure seismic waves created by a source such as an air gun or a dynamite charge, to obtain detailed information about various sub-surface strata of earth.

As shown in FIG. 1A, a typical crystal hydrophone 100 includes a diaphragm 102, a crystal 104, and a housing 106 that is typically filled with a gas 107. The diaphragm 102, which has front and rear sides 102a, 102b, is made from a material such as Kovar or a Beryllium Copper compound, and is electrically connected to the crystal by a conductive epoxy 108. The crystal 104 is typically made from a material such as Lead Zirconium Titanate, and is silver-plated on its top 104a and bottom 104b to achieve better conductivity. The crystal 104 is initially polarized by applying a high-voltage electrical charge to the crystal 104. When the polarized crystal 104 experiences pressure resulting from a physical input such as sound, fluid pressure, or another type of pressure, it produces a voltage representative of the pressure experienced. The crystal 104 is electrically connected to electrical output leads 110, 112. To protect the crystal 104 from contaminants, and to maintain the crystal 104 in atmospheric pressure, the crystal 104 and the rear side 102b of the diaphragm 102 are sealed within the gas-filled housing 106. The housing 106 protects the crystal 104 and diaphragm 102, and facilitates mounting of the hydrophone 100.

The diaphragm 102 functions to vibrate in response to physical pressures it experiences. The physical deflection of the diaphragm 102 is transferred by the epoxy 108 to the crystal 104, deforming the electron structure of the crystal 104 and causing an electrical potential to be provided across the leads 110, 112.

Another apparatus that is also useful in petroleum exploration is the accelerometer. Accelerometers are commonly used to measure the motion of the earth's surface in response to seismic waves created by a seismic source, to obtain detailed information about various sub-surface strata in the earth.

As mentioned above, hydrophones and accelerometers are often used in petroleum exploration in conjunction with seismic equipment. In one example of such an application (FIG. 1B), a cable 150 including one or more hydrophones and one or more accelerometers is placed on the sea floor 154. Such a cable may be made up of cylindrical units 152, where each unit 152 includes a geophone and an accelerometer.

Seismic waves are produced by a seismic source 156 that is towed behind a ship 158; the seismic source 156 may comprise an air gun, a dynamite charge, or the like. The seismic source 156 produces a large explosion, creating seismic waves 160. The seismic waves 160 travel through water 162 and various layers of earth 164, and are reflected back to the cable 150 as upgoing incident waves 161. Each unit 152 detects and measures the incident waves 161 and creates a real-time record of the results. This record is typically stored in a recorder (not 20 shown) that is linked to or contained within the cable 150. Records of this nature help geologists determine the makeup of the earth 164.

One problem with this arrangement, however, is surface ghost signals 166. Surface ghost signals 166 are produced by incident waves 161 that are reflected from the water's surface 168. At the wavelengths typically used for seismic signals, the surface 168 provides an effective mirror to reflect incident waves 161 and create downgoing surface ghost signals 166. Surface ghost signals 166 contain no additional information regarding the composition of the earth 164 or the possible petroleum deposits therein, and they interfere with the proper receipt and interpretation of the incident waves 161. Accordingly, it is desirable to eliminate the errors introduced by the surface ghost signals 166.

A hydrophone-accelerometer combination, in theory, is naturally suited to eliminate surface ghost signals. Generally, hydrophones detect pressure omnidirectionally, and accelerometers detect force or acceleration, which is directional. Due to the relative strengths of the incident waves 161 and the surface ghost signals 166 at different depths, a hydrophone's output and an accelerometer's output will both vary with depth. For a seismic wave 161 of a given magnitude and frequency, a hydrophone's output will vary with depth sinusoidally (curve 180, FIG. 1C). Likewise, for the given seismic wave 161, an accelerometer's output will vary sinusoidally with depth (curve 182, FIG. 1C). The hydrophone and accelerometer outputs may be scaled by external circuitry or by a mathematical algorithm in a computer, so that their peak values have the same amplitude; for example, in FIG. 1C, the hydrophone and accelerometer outputs are scaled to a maximum peak amplitude of 1 and a minimum peak amplitude of −1. After such scaling, the sum of the hydrophone and accelerometer outputs will always be 1, irrespective of the depth at which the hydrophone and accelerometer are both located (curve 184, FIG. 1C). Therefore, in theory, a hydrophone output and an accelerometer output may be combined to effectively eliminate the influence of surface ghost signals 166.

One problem in applying this theory is that the frequency responses of hydrophones and accelerometers differ. Therefore, the hydrophone and accelerometer outputs will only complement each other as shown in FIG. 1C when the seismic wave 160 has a certain frequency. As a result, if the frequency of the seismic wave 160 were to change, the combined hydrophone-accelerometer output 184 would no longer be constant.

The difference between frequency responses of hydrophones and accelerometers will now be explained with reference to FIGS. 2–4B. When an electronic amplifier 200 (FIG. 2) is utilized to amplify the output of a typical hydrophone 202, the frequency response of the hydrophone 202 (FIGS. 3A, 3B) resembles that of a single-pole high pass filter, since it exhibits a single pole and a 6 dB/octave slope at frequencies less than its natural frequency ($f_n$). The amplifier 200 may comprise an operational amplifier. The hydrophone may be modeled as a voltage source 202a and a capacitor 202b and resistor 202c in series; the capacitor 202b and the resistors 202c and 204 provide the single pole, and hence the 6 dB/octave slope. The natural frequency of the hydrophone 202 depends upon the value of the internal resistance 204 ($R_i$) of the amplifier 200, the resistance ($R_H$) of the resistor 202c, and the capacitance ($C_H$) of the capacitor 202b; this relationship is shown in equation 1.0, below.

$$f_n = \frac{1}{2\pi(R_H + R_I)C}(\text{Hz})$$

For typical hydrophones, the natural frequency ranges from about 2 to 3 Hz.

In contrast to the hydrophone 202, as illustrated in FIGS. 4A and 4B, the frequency response of a typical force-balance accelerometer, such as that disclosed in U.S. Pat. No. 5,852,242, issued on Dec. 22, 1998, the disclosure of which is incorporated herein by reference, resembles an electrical circuit having a differentiating element in combination with a pair of simple lag elements. The resulting frequency response exhibits a 6 dB/octave slope at frequencies less than a first cut-off frequency ($F_{c1}$), a substantially flat response between the first cut-off frequency ($F_{c1}$) and a second cut-off frequency ($F_2$), and a −6 dB/octave slope at frequencies greater than the second cut-off frequency ($F_{c2}$). For typical force-balance accelerometers, the first cut-off frequency ($F_{c1}$) ranges from about 1 to 10 Hz, and the second cut-off frequency ($F_{c2}$) ranges from about 1K to 100K Hz.

For the reasons explained above, hydrophones and accelerometers have different frequency response characteristics. Accordingly, hydrophones and accelerometers are not naturally suited to eliminate ghost signals 166 across the whole spectrum of desired frequency. To use a hydrophone with an accelerometer advantageously, the frequency response of the hydrophone must match the frequency response of the accelerometer.

The present invention is directed to overcoming one or more of the limitations of conventional hydrophones.

SUMMARY OF THE INVENTION

According to one aspect of the present invention, a hydrophone assembly is provided that includes a hydrophone and a hydrophone filter coupled to the hydrophone. The frequency response of the hydrophone assembly matches the frequency response of an accelerometer.

According to another aspect of the present invention, an apparatus for measuring seismic waves is provided that includes an accelerometer and a hydrophone assembly. The hydrophone assembly includes a hydrophone and a hydrophone filter coupled to the hydrophone. The frequency response of the hydrophone assembly matches the frequency response of an accelerometer.

According to another aspect of the present invention, a marine seismic acquisition system is provided that includes a seismic source for generating seismic energy, a hydrophone for detecting seismic energy, a hydrophone filter coupled to the hydrophone, an accelerometer for detecting seismic energy, a seismic recorder coupled to the accelerometer and the hydrophone filter, and a controller coupled to the seismic source and seismic recorder for controlling and monitoring the operation of the seismic source and seismic recorder. The frequency response of the combination of the hydrophone and hydrophone filter matches the frequency response of the accelerometer.

According to another aspect of the present invention, a method of providing a hydrophone assembly having a frequency response that matches that of an accelerometer is provided that includes filtering the output of the hydrophone with a circuit that provides a differentiator and a pair of simple lags.

According to another aspect of the present invention, a method of measuring seismic energy using a hydrophone assembly and an accelerometer is provided that includes placing the hydrophone assembly and accelerometer in a body of water, generating seismic energy in the body of water, measuring the seismic energy using the hydrophone assembly and the accelerometer, scaling the output of either the accelerometer or hydrophone assembly, and generating an output signal substantially free from surface ghost signals by summing scaled output with the non-scaled output. The frequency response of the hydrophone assembly matches the frequency response of the accelerometer.

DETAILED DESCRIPTION OF THE ILLUSTRATIVE EMBODIMENTS

A hydrophone and filter assembly for use in a marine seismic acquisition system is provided. The hydrophone and filter assembly have a frequency response that closely resembles that of an accelerometer.

Figure 1A:
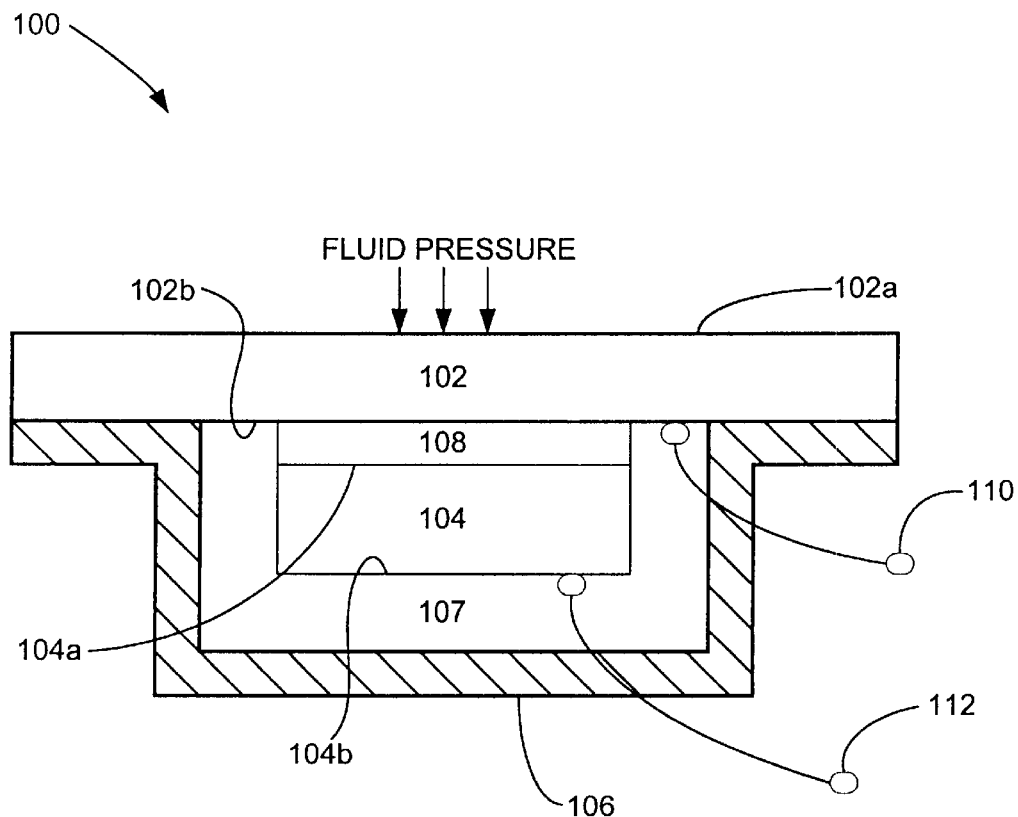
FIG. 1A is a cross-sectional side view of a typical hydrophone.
Figure 1B:
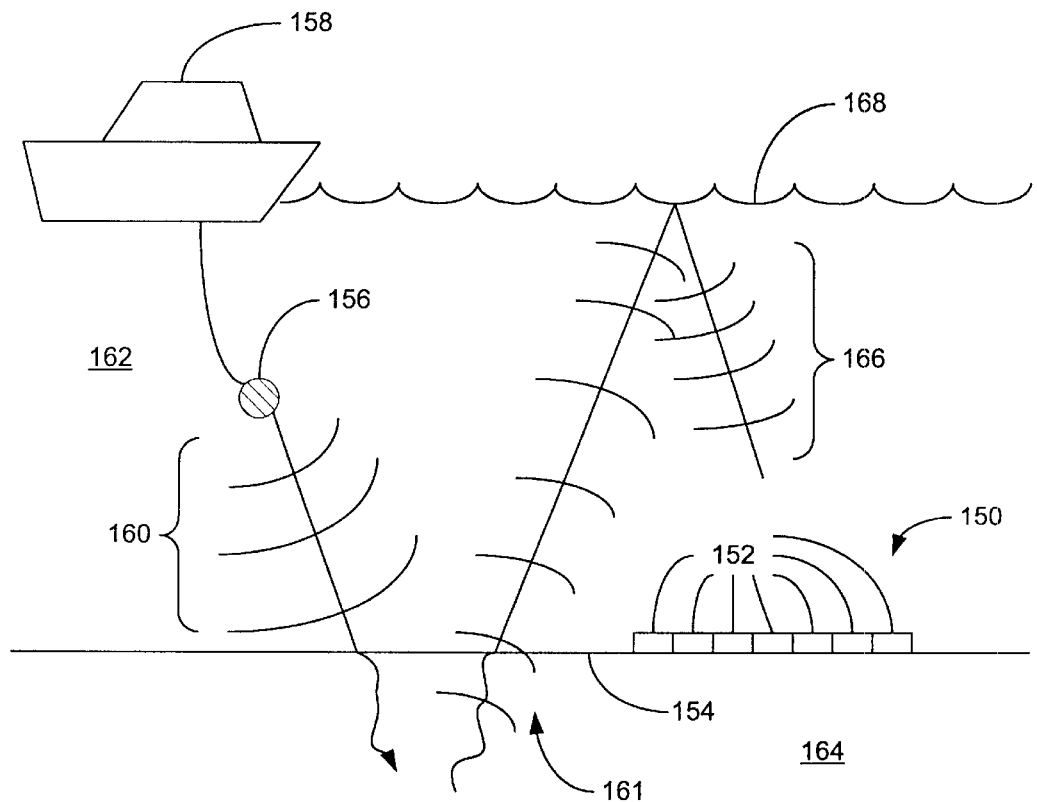
FIG. 1B is an illustration of the use of a ocean bottom cable in conjunction with seismic equipment for petroleum exploration.
Figure 1C:
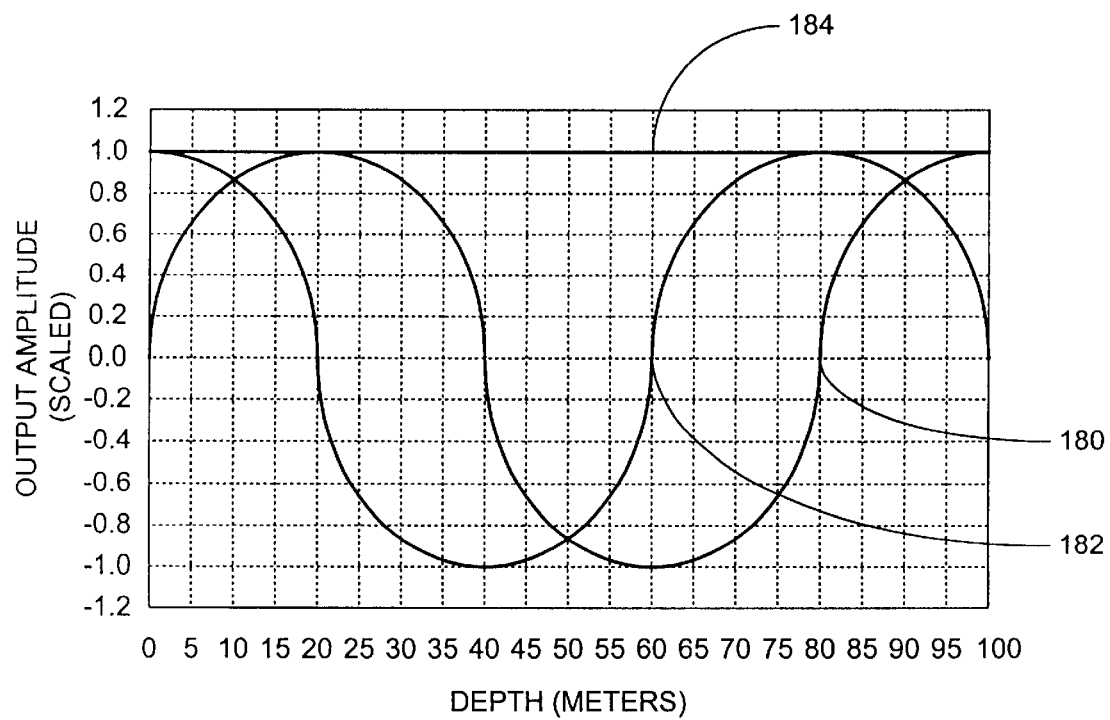
FIG. 1C is a graphical illustration of the use of the output of a hydrophone and an accelerometer to negate the influence of surface ghost signals.
Figure 2:
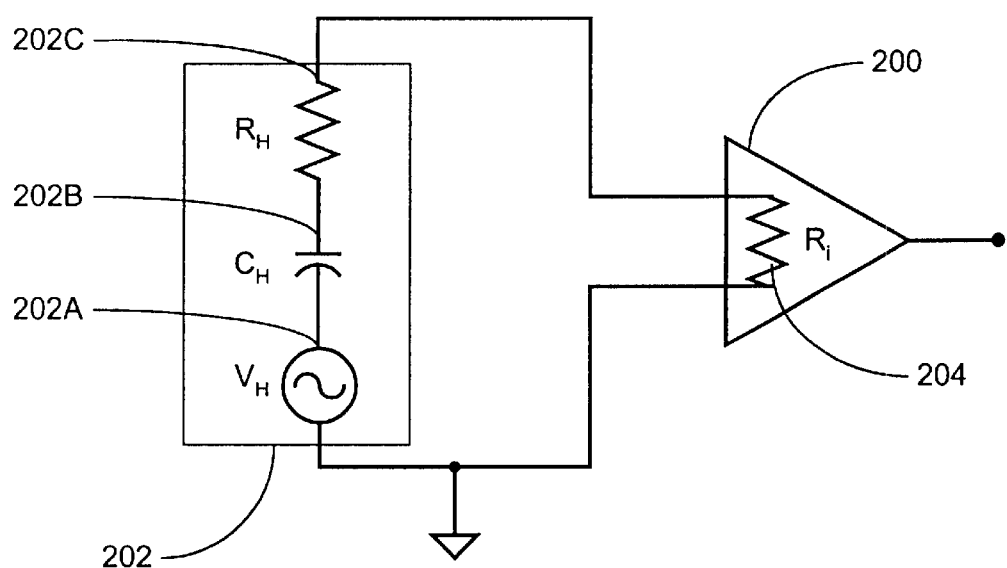
FIG. 2 is an electrical schematic model of a hydrophone-amplifier.
Figure 3A:
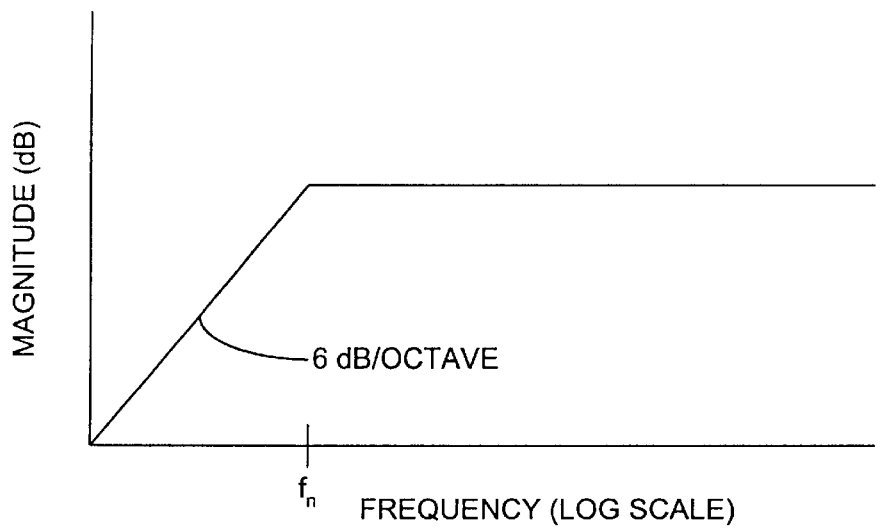
FIG. 3A is a graphical illustration of the frequency response (magnitude) of a hydrophone coupled to an amplifier.
Figure 3B:
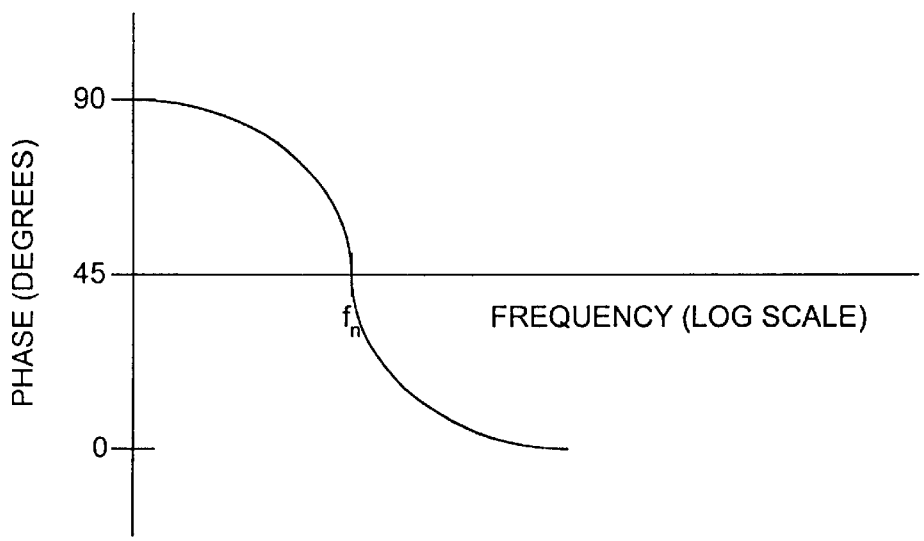
FIG. 3B is a graphical illustration of the frequency response (phase) of a hydrophone coupled to an amplifier.
Figure 4A:
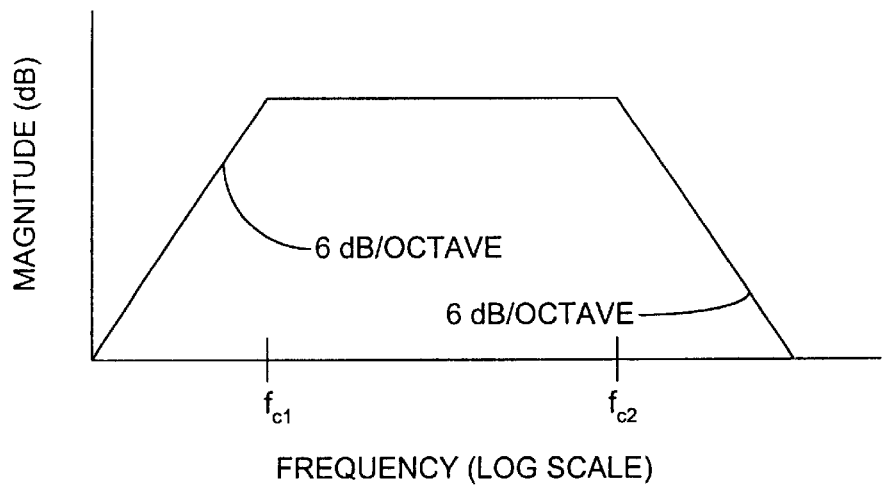
FIG. 4A is a graphical illustration of the frequency response (magnitude) of a typical force-balance accelerometer.
Figure 4B:
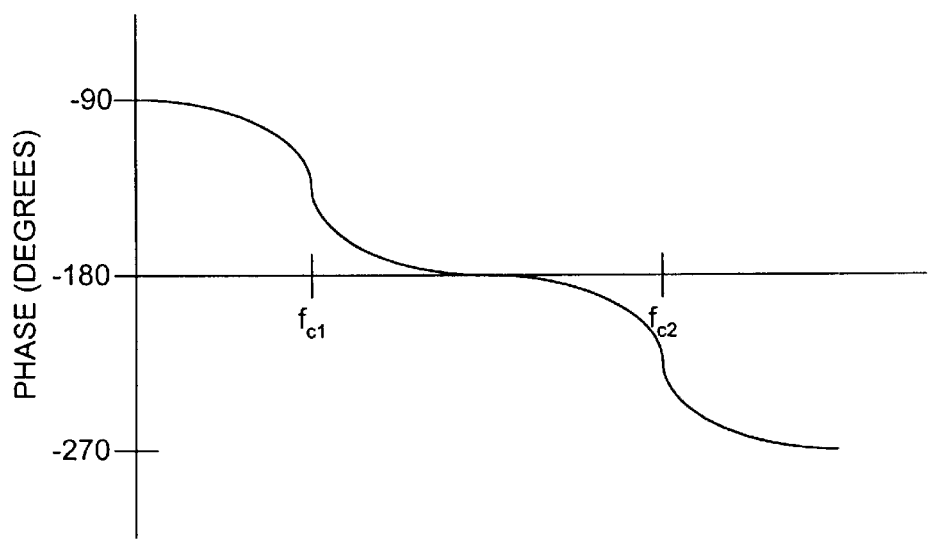
FIG. 4B is a graphical illustration of the frequency response (phase) of a typical force-balance accelerometer.
Figure 5:
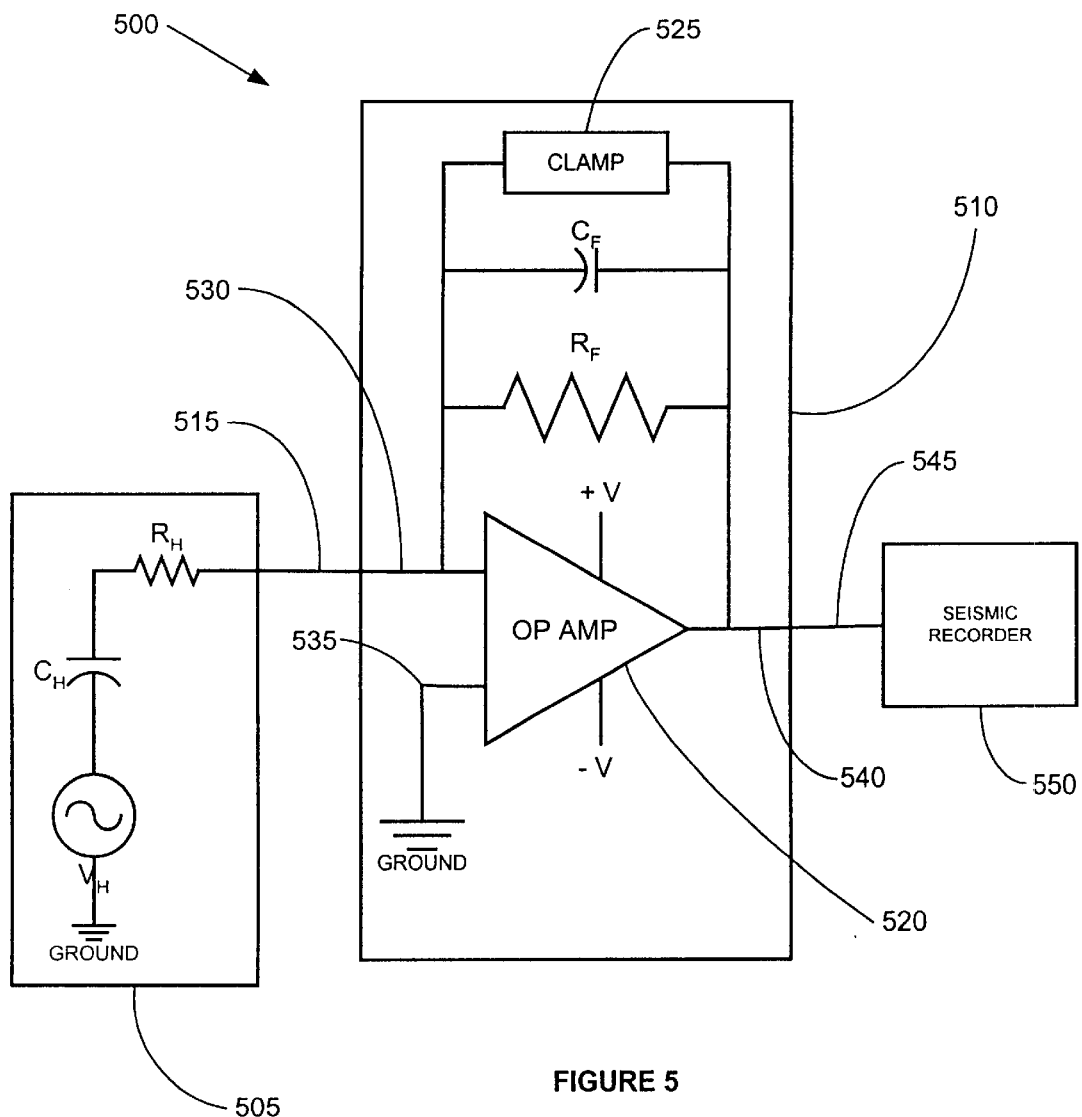
FIG. 5 is a schematic illustration of an embodiment of a hydrophone including a filter.

Referring to FIG. 5, a hydrophone and filter assembly 500 includes a conventional hydrophone 505 and a hydrophone filter 510. As described below, the hydrophone and filter assembly 500 preferably have a frequency response that closely matches the frequency response of a force-balance accelerometer.

The hydrophone 505 includes a voltage source $V_H$, a capacitor $C_H$, and a resistor $R_H$. The hydrophone 505 may comprise any number of conventional commercially available hydrophones such as, for example, Benthos AQ5. In a preferred embodiment, the hydrophone 505 comprises a model Preseis 2524 available from Input/Output in Stafford, TX in order to optimally provide operation to increased depths.

The hydrophone filter 510 is coupled to the output 515 of the hydrophone 505. The hydrophone filter 510 preferably includes an op amp 520, a resistor $R_F$, a capacitor $C_F$, and a clamp 525. The op amp 520 includes a pair of inputs, 530 and 535, and an output 540. The first input 530 of the op amp 520 is coupled to the output 515 of the hydrophone 505, the resistor $R_F$, the capacitor $C_F$, and the clamp 525. The second input of the op amp 520 is coupled to ground. The output 540 of the op amp 520 is coupled to the resistor $R_F$, the capacitor $C_F$, and the clamp 525. In a preferred embodiment, the output 540 of the op amp 520 is further coupled to the input 545 of a conventional seismic recorder 550.

The op amp 520 may comprise any number of conventional commercially available op amps such as, for example, Analog Devices AD 824. In a preferred embodiment, the op amp 520 comprises an OP 134 available from Burr-Brown in order to optimally provide high gain over a wide bandwidth.

The resistor $R_F$ may comprise any number of conventional commercially available resistors such as, for example, KOA, IRC or DALE. In a preferred embodiment, the resistor $R_F$ comprises a model RK73H2A available from KOA having a resistance ranging from about 1050 to 1070 ohms in order to optimally provide a high frequency pole.

The capacitor $C_F$ may comprise any number of conventional commercially available capacitors. In an exemplary embodiment, the capacitor $C_F$ is integral to the hydrophone 505.

In a particularly preferred embodiment, the product of the resistance and capacitance of the resistor $R_F$ and the capacitor $C_F$ provide a high-frequency cut-off of around 20 KHz.

The clamp 525 functions to limit the excursion of the electrical signals by clipping them off at predetermined levels. In a preferred embodiment, the clamp 525 is selected to clip the electrical signals when their excursion exceeds about 4.0 to 4.5 volts. The clamp 525 may comprise any number of conventional commercially available clamping circuits. In an alternative preferred embodiment, the clamp 525 is omitted for circumstances in which excessive signal excursion is not present, or does not present a hazard to the operation of the system.

The laplace transfer of the transfer function of the hydrophone and filter assembly 500 may be expressed as follows.

$$\frac{-R_F C_H s}{(1 + R_F C_F s)(1 + R_H C_H s)}$$

Figure 6A:
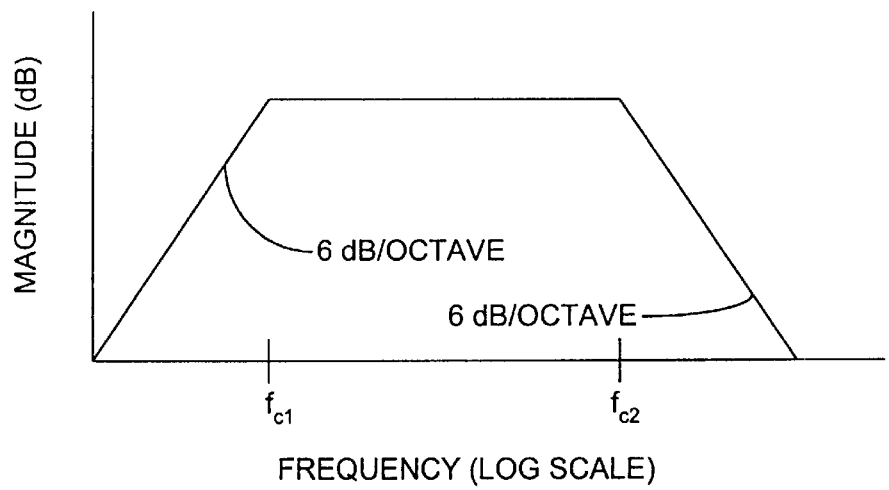
FIG. 6A is a graphical illustration of the frequency response (magnitude) of the hydrophone and filter of FIG. 5.
Figure 6B:
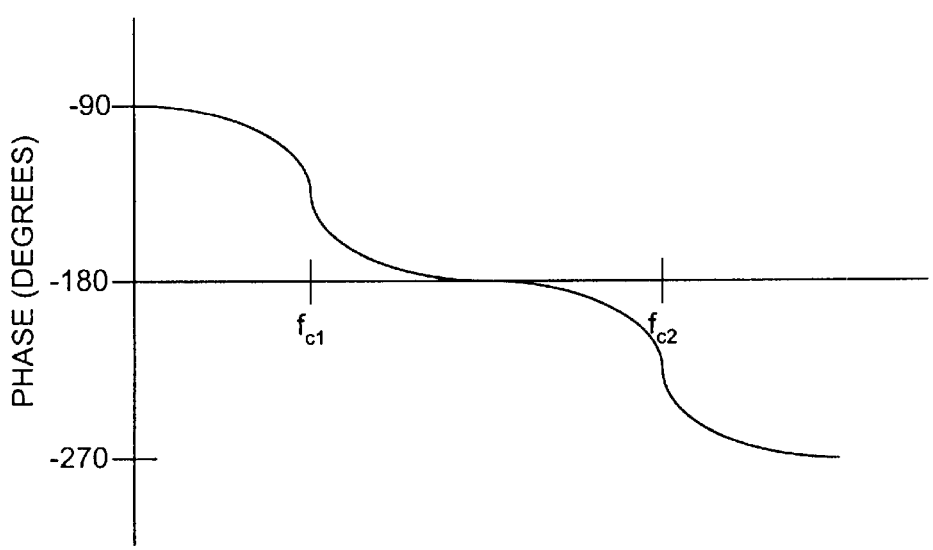
FIG. 6B is a graphical illustration of the frequency response (phase) of a hydrophone and filter of FIG. 5.

Thus, the hydrophone and filter assembly 500 provides a circuit including a differentiator and a pair of simple lags. The corresponding frequency response for the hydrophone and filter assembly 500 is illustrated in FIGS. 6A and 6B. The resulting frequency response exhibits a 6 dB/octave slope at frequencies less than a first cut-off frequency ($F_{c1}$), a substantially flat response between the first cut-off frequency ($F_{c1}$) and a second cut-off frequency ($F_{c2}$), and a −6 dB/octave slope at frequencies greater than the second cut-off frequency ($F_{c2}$). In a preferred embodiment, the first cut-off frequency ($F_{c1}$) ranges from about 1K to 1.1K Hz, and the second cut-off frequency ($F_{c2}$) ranges from about 20K to 20.2K Hz in order to optimally detect the acoustic signals generated using typical seismic acquisition systems.

In an exemplary embodiment, the hydrophone 505 has a natural frequency of about 2.5 Hz, the resistor $R_H$ has a resistance of about 2.133 MΩ, and the capacitor $C_H$ has a capacitance of about 75 pF. These operating parameters provided a first cut-off frequency ($F_{c1}$) of about 15.69 Hz and a second cut-off frequency ($F_{c2}$) of about 6289 Hz.

Figure 7:
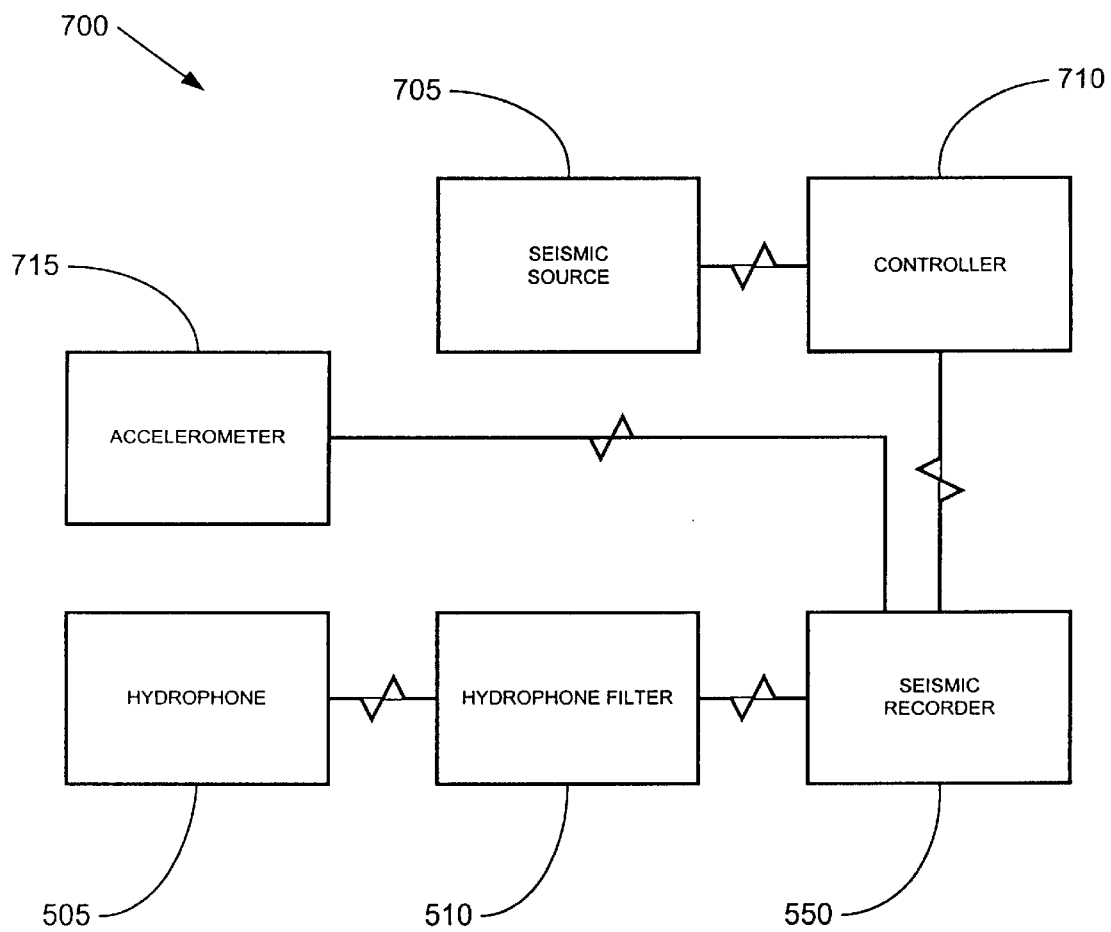
FIG. 7 is a schematic illustration of a marine seismic acquisition system.

Referring now to FIG. 7, in a preferred embodiment, the hydrophone 505, hydrophone filter 510, and the seismic recorder 550 are used in a marine seismic acquisition system 700 that further includes a seismic source 705, a controller 710, and an accelerometer 715.

Figure 8:
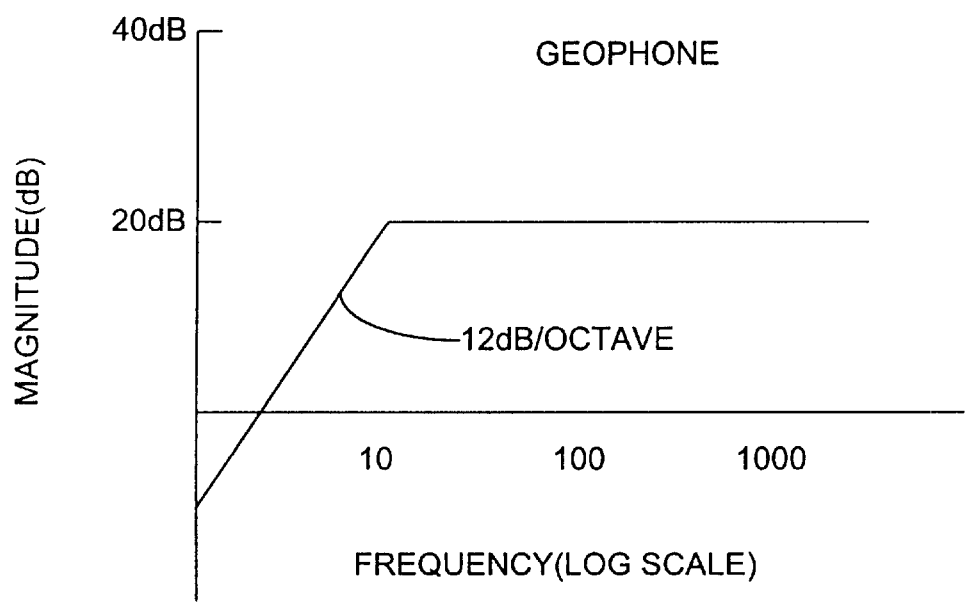
FIG. 8 is an illustration of the frequency response of an exemplary embodiment of a geophone to particle motion.
Figure 9:
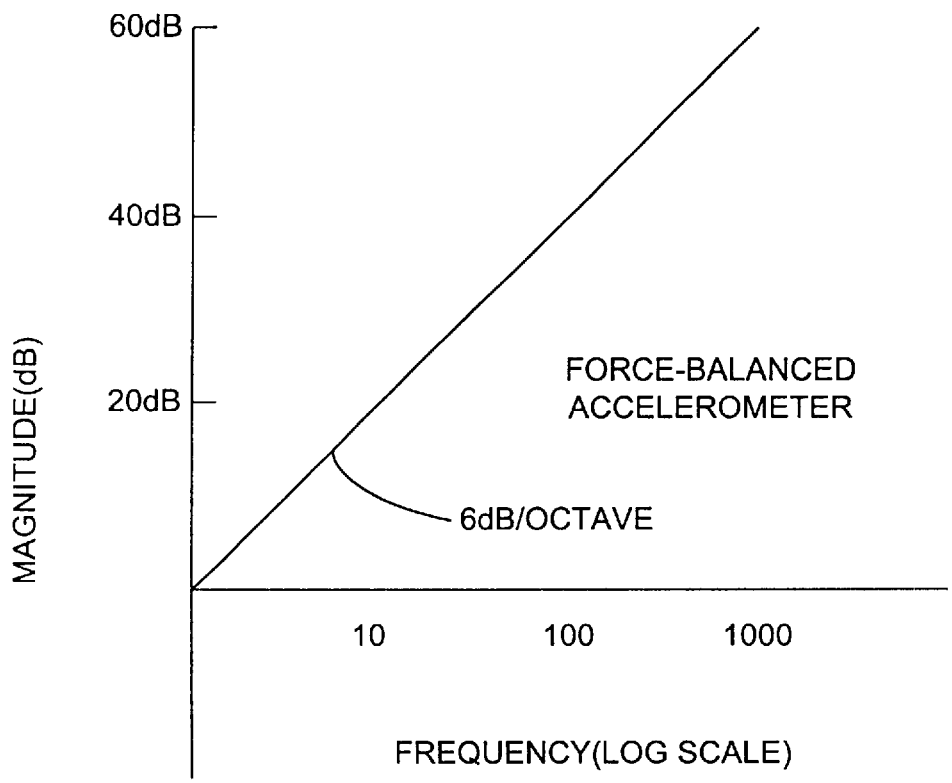
FIG. 9 is an illustration of the frequency response of an exemplary embodiment of a force-balance accelerometer to particle motion.
Figure 10:
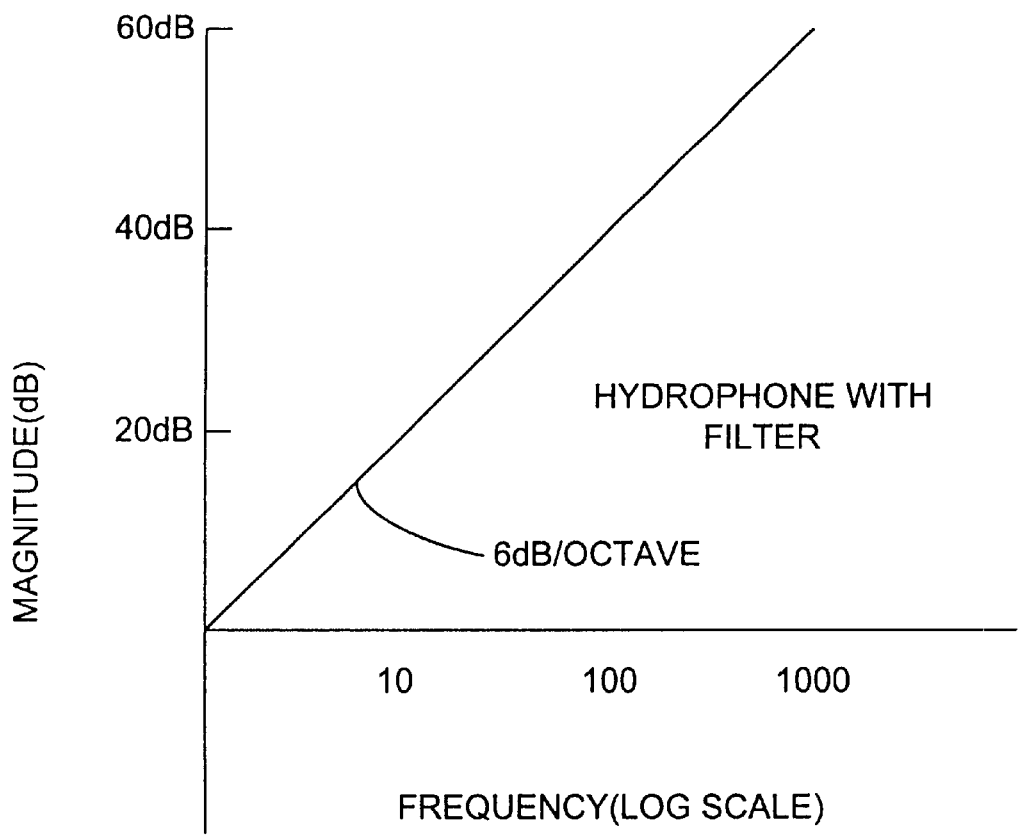
FIG. 10 is an illustration of the frequency response of an exemplary embodiment of a hydrophone with a filter to particle motion.

Referring now to FIGS. 8, 9 and 10, the frequency response of a geophone, a force-balance accelerometer 715 and a hydrophone 505 including a filter 510 in response to particle motion are illustrated. As shown in FIGS. 9 and 10, the accelerometer 715 and the hydrophone 505 and filter 510 exhibit the same frequency response to particle motion.

A hydrophone assembly has been described that includes a hydrophone and a hydrophone filter coupled to the hydrophone. The frequency response of the hydrophone assembly matches the frequency response of an accelerometer. In a preferred embodiment, the hydrophone includes a resistor and a capacitor. In a preferred embodiment, the hydrophone filter includes an operational amplifier, a resistor, and a capacitor. In a preferred embodiment, the frequency response of the hydrophone assembly matches that of a differentiator in combination with a pair of simple lags. In a preferred embodiment, the frequency response of the hydrophone assembly exhibits a 6 dB/octave slope for frequencies less than a first cut-off frequency, exhibits a flat response for frequencies between the first cut-off frequency and a second cut-off frequency, and exhibits a −6 dB/octave slope for frequencies greater than the second cut-off frequency.

An apparatus for measuring seismic waves has also been described that includes an accelerometer and a hydrophone assembly. The hydrophone assembly includes a hydrophone and a hydrophone filter coupled to the hydrophone. The frequency response of the hydrophone assembly matches the frequency response of an accelerometer. In a preferred embodiment, the hydrophone includes a resistor and a capacitor. In a preferred embodiment, the hydrophone filter includes an operational amplifier, a resistor, and a capacitor. In a preferred embodiment, the frequency response of the hydrophone assembly matches that of a differentiator in combination with a pair of simple lags. In a preferred embodiment, the frequency response of the hydrophone assembly exhibits a 6 dB/octave slope for frequencies less than a first cut-off frequency, exhibits a flat response for frequencies between the first cut-off frequency and a second cut-off frequency, and exhibits a −6 dB/octave slope for frequencies greater than the second cut-off frequency.

A marine seismic acquisition system has been described that includes a seismic source for generating seismic energy, a hydrophone for detecting seismic energy, a hydrophone filter coupled to the hydrophone, an accelerometer for detecting seismic energy, a seismic recorder coupled to the accelerometer and the hydrophone filter, and a controller coupled to the seismic source and seismic recorder for controlling and monitoring the operation of the seismic source and seismic recorder. The frequency response of the combination of the hydrophone and hydrophone filter matches the frequency response of the accelerometer. In a preferred embodiment, the hydrophone includes a resistor and a capacitor. In a preferred embodiment, the hydrophone filter includes an operational amplifier, a resistor, and a capacitor. In a preferred embodiment, the frequency response of the hydrophone assembly matches that of a differentiator in combination with a pair of simple lags. In a preferred embodiment, the frequency response of the hydrophone assembly exhibits a 6 dB/octave slope for frequencies less than a first cut-off frequency, exhibits a flat response for frequencies between the first cut-off frequency and a second cut-off frequency, and exhibits a −6 dB/octave slope for frequencies greater than the second cut-off frequency.

A method of providing a hydrophone assembly having a frequency response that matches that of an accelerometer has been described that includes filtering the output of the hydrophone with a circuit that provides a differentiator and a pair of simple lags. In a preferred embodiment, the frequency response of the hydrophone assembly exhibits a slope of 6 dB/octave for frequencies less than a first cut-off frequency, exhibits a flat response for frequencies between the first cut-off frequency and a second cut-off frequency, and exhibits a −6 dB/octave slope for frequencies greater than the second cut-off frequency.

A method of measuring seismic energy using a hydrophone assembly and an accelerometer has been described that includes placing the hydrophone assembly and accelerometer in a body of water, generating seismic energy in the body of water, measuring the seismic energy using the hydrophone assembly and the accelerometer, scaling the output of either the accelerometer or hydrophone assembly, and generating an output signal substantially free from surface ghost signals by summing scaled output with the non-scaled output. The frequency response of the hydrophone assembly matches the frequency response of the accelerometer. In a preferred embodiment, the frequency response of the hydrophone assembly exhibits a slope of 6 dB/octave for frequencies less than a first cut-off frequency, exhibits a flat response for frequencies between the first cut-off frequency and a second cut-off frequency, and exhibits a −6 dB/octave slope for frequencies greater than the second cut-off frequency.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. An apparatus for measuring response to seismic waves, comprising:
   a hydrophone assembly, the hydrophone assembly further including:
   a hydrophone; and
   a hydrophone filter coupled to the hydrophone to closely match a frequency response of the hydrophone assembly to a frequency response of an accelerometer, wherein the frequency response of the hydrophone assembly includes a first cut-off frequency and a second cut-off frequency and wherein the hydrophone assembly frequency response has a positive slope below the first cut-off frequency and a negative slope above second cut-off frequency.

2. The apparatus of claim 1, wherein the frequency response of the hydrophone assembly is substantially flat between the first cut-off frequency and the second cut-off frequency.

3. The apparatus of claim 1, wherein the hydrophone filter includes:
   an operational amplifier;
   a resistor; and
   a capacitor.

4. The apparatus of claim 1, wherein the frequency response of the hydrophone assembly exhibits a 6 dB/octave slope for frequencies less than a first cut-off frequency, exhibits a flat response for frequencies between the first cut-off frequency and a second cut-off frequency, and exhibits a −6 dB/octave slope for frequencies greater than the second cutoff frequency.

5. The apparatus of claim 1 further comprising an accelerometer.

6. The apparatus of claim 5, wherein the frequency response of the hydrophone assembly closely matches that of the accelerometer.

7. A marine seismic acquisition system, comprising:
   a seismic source for generating seismic energy;
   a hydrophone for detecting seismic energy;
   an accelerometer for detecting seismic energy;
   a hydrophone filter coupled to the hydrophone forming a hydrophone assembly,
   wherein a frequency response of the combination of the hydrophone and
   hydrophone filter closely matches a frequency response of the accelerometer and wherein the hydrophone assembly frequency response has a positive slope below a first cut-off frequency and a negative slope above a second cut-off frequency;
   a seismic recorder for recording an output of the accelerometer and an output of the hydrophone assembly; and
   a controller coupled to the seismic source and seismic recorder for controlling
   and monitoring the operation of the seismic source and seismic recorder.

8. The system of claim 7, wherein the hydrophone filter includes:
   an operational amplifier;
   a resistor; and
   a capacitor.

9. The apparatus of claim 7, wherein the frequency response of the hydrophone assembly is substantially flat between the first cut-off frequency and the second cut-off frequency.

10. The apparatus of claim 7, wherein the frequency response of the hydrophone assembly exhibits a 6 dB/octave slope for frequencies less than the first cut-off frequency, exhibits a flat response for frequencies between the first cut-off frequency and the second cut-off frequency, and exhibits a −6 dB/octave slope for frequencies greater than the second cut-off frequency.

11. A method for measuring response to seismic waves, comprising:
   measuring the seismic waves using a hydrophone assembly, the hydrophone assembly further including a hydrophone and a hydrophone filter coupled to the hydrophone; and closely matching a frequency response of the hydrophone assembly to a frequency response of an accelerometer using the hydrophone filter, wherein the hydrophone assembly frequency response has a positive slope below a first cut-off frequency and a negative slope above the second cut-off frequency.

12. The method of claim 11, wherein the frequency response of the hydrophone assembly is substantially flat between the first cut-off frequency and the second cut-off frequency.

13. The method of claim 11, wherein the frequency response of the hydrophone assembly exhibits a 6 dB/octave slope for frequencies less than a first cut-off frequency, exhibits a flat response for frequencies between the first cut-off frequency and a second cut-off frequency, and exhibits a −6 dB/octave slope for frequencies greater than the second cut-off frequency.

14. The method of claim 11 further comprising measuring the seismic waves using an accelerometer.

15. The method of claim 14, wherein the frequency response of the hydrophone assembly closely matches that of the accelerometer.

16. The method of claim 11 further comprising:

i) generating seismic energy with a seismic source; and ii) recording an output of the accelerometer and an output of the hydrophone assembly using a seismic recorder.

17. The method of claim 16 further comprising controlling operation of the seismic source and seismic recorder using at least one controller.

\* \* \* \* \*